United States Patent [19]
Foladare et al.

[11] Patent Number: 5,907,811
[45] Date of Patent: May 25, 1999

[54] PERSONAL REACH SERVICE WITH PAGING AND OPTIONAL POINT OF ENTRY VIA CELLULAR NETWORK

[75] Inventors: Mark Jeffrey Foladare, Kendall Park; Shelley B. Goldman, East Brunswick; David Phillip Silverman, Somerville; Roy Philip Weber, Bridgewater, all of N.J.

[73] Assignee: AT&T Corp, Middletown, N.J.

[21] Appl. No.: 08/686,976

[22] Filed: Jul. 25, 1996

[51] Int. Cl.[6] ................................ H04Q 7/20; H04Q 7/06
[52] U.S. Cl. ............................................. 455/459; 455/413
[58] Field of Search .................................. 455/459, 460, 455/461

[56] References Cited

U.S. PATENT DOCUMENTS

| | | | |
|---|---|---|---|
| 5,307,399 | 4/1994 | Dai et al. ................................. | 455/459 |
| 5,546,442 | 8/1996 | Foladare et al. ......................... | 379/210 |
| 5,559,859 | 9/1996 | Dai et al. ................................. | 455/459 |
| 5,598,457 | 1/1997 | Foladare et al. ......................... | 455/459 |
| 5,608,782 | 3/1997 | Carlsen et al. .......................... | 455/459 |
| 5,703,930 | 12/1997 | Miska et al. ............................ | 455/459 |
| 5,706,329 | 1/1998 | Foladare et al. ......................... | 379/57 |
| 5,742,906 | 4/1998 | Foladare et al. ......................... | 455/461 |

*Primary Examiner*—David R. Hudspeth
*Assistant Examiner*—M. David Sofocleous
*Attorney, Agent, or Firm*—Stephen M. Gurey

[57] ABSTRACT

A personal reach system includes a network, a personal reach unit, a cellular network, and a landline telephone station. The personal reach unit is coupled to the cellular network and the landline telephone through the network. When a first party pages a second party through the personal research unit, the first party is connected to the second party by either the personal reach unit through the landline telephone station or the cellular network through the cellular phone.

40 Claims, 3 Drawing Sheets

PERSONAL REACH SERVICE WITH PAGING AND OPTIONAL POINT OF ENTRY VIA CELLULAR NETWORK

BACKGROUND OF THE INVENTION

1. Field of the Invention

This invention relates to a personal reach service that provides an optional cellular network point of entry.

2. Description of Related Art

Conventional cellular phones have become extremely popular. One of the reasons for this popularity is the ability to reach highly mobile individuals carrying cellular phones. Cellular phones have all the advantages of pagers with the additional convenience of being able to answer the page immediately with the cellular phone.

When answering a page using a cellular phone, a subscriber is connected with the paging party through a cellular network as well as through a bridging and signaling unit of a personal reach service system. Both the cellular network and a bridging and signaling unit of the personal reach service are required to provide the convenient option of answering a page via the cellular phone. Thus, the subscriber pays for both the cellular network and the bridging and signaling unit of the personal reach service resulting in a high cost to the subscriber. Accordingly, there is a need to reduce subscriber's cost for cellular phone paging.

SUMMARY OF THE INVENTION

The invention provides a personal reach system that reduces the cost to subscribers of a paging service using cellular phones. When paged, a subscriber is connected to a paging party through either a direct connection between the paging party and the subscriber via a cellular network and a cellular phone, or by bridging the paging party and the subscriber through a bridging and signalling unit. Thus, the subscriber pays for either the costs associated with the cellular network or the costs associated with the bridging and signalling unit and not both.

Specifically, the personal reach system includes a personal reach unit coupled through a network to a cellular network. The cellular network includes a cellular phone. The personal reach system is also coupled to a landline phone through the network. When a first party pages a second party, the first party is connected to the second party through either the personal reach unit and the landline telephone station or the cellular network and the cellular phone.

Paging the subscriber through the cellular phone is advantageous because the cellular phone is not required to be turned on to receive a page. Thus, a page may be received at any time whereas to receive a call through the cellular phone, the cellular phone must be on. Further, when receiving a page, the calls to the cellular phone are in-bound and not out-bound. Out-bound calls need security information. Thus, there is no need for the security information when paging through a cellular phone.

BRIEF DESCRIPTION OF THE DRAWINGS

The invention is described in detail with reference to the following drawings, wherein like numerals represent like elements.

DETAILED DESCRIPTION OF PREFERRED EMBODIMENTS

Figure 1:
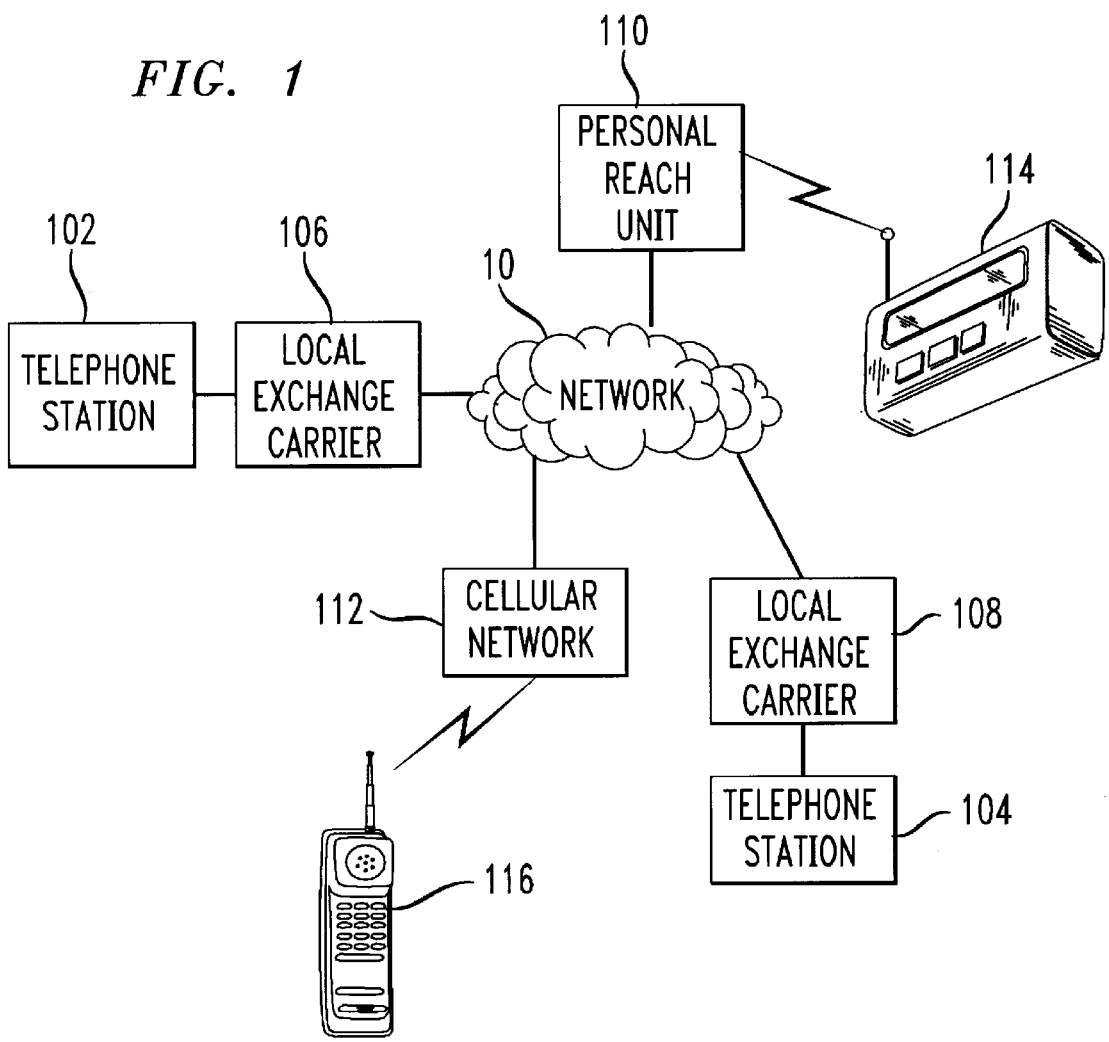
FIG. 1 is a block diagram of a telephone network that includes a personal reach system as well as a cellular network.

FIG. 1 shows telephone stations 102 and 104 connected to a network 10 through local exchange carriers 106 and 108. A personal reach system 110 is also connected to the network 10 as well as a cellular network 112. The personal reach system 110 includes broadcasting capabilities to wirelessly communicate with pagers such as pager 114. The cellular network 112 also has wireless communication capabilities to communicate with cellular phones such as cellular phone 116.

A first party may page a second party by calling the second party's paging telephone number via a telephone station 102. The second party subscribes to a cellular phone paging service and carries a cellular phone 116. The first party's call is connected to a personal reach system 110 through the local exchange carrier 106 and the network 10. The personal reach system 110 then connects to the cellular network 112 which in turn pages the cellular phone 116 using a data channel of the cellular phone 116. If the second party also subscribes to a conventional paging service, the personal reach system 110 also pages the second party through a pager such as pager 114.

When the second party is paged through the cellular phone 116 and/or the pager 114, the second party may choose to respond to the page by calling a telephone number assigned to the second party. The second party may call using either the cellular phone 116 or a landline telephone station such as telephone station 104. The second party's call is bridged by the personal reach system 110 to the first party so that the first and second parties may be connected together.

Figure 2:
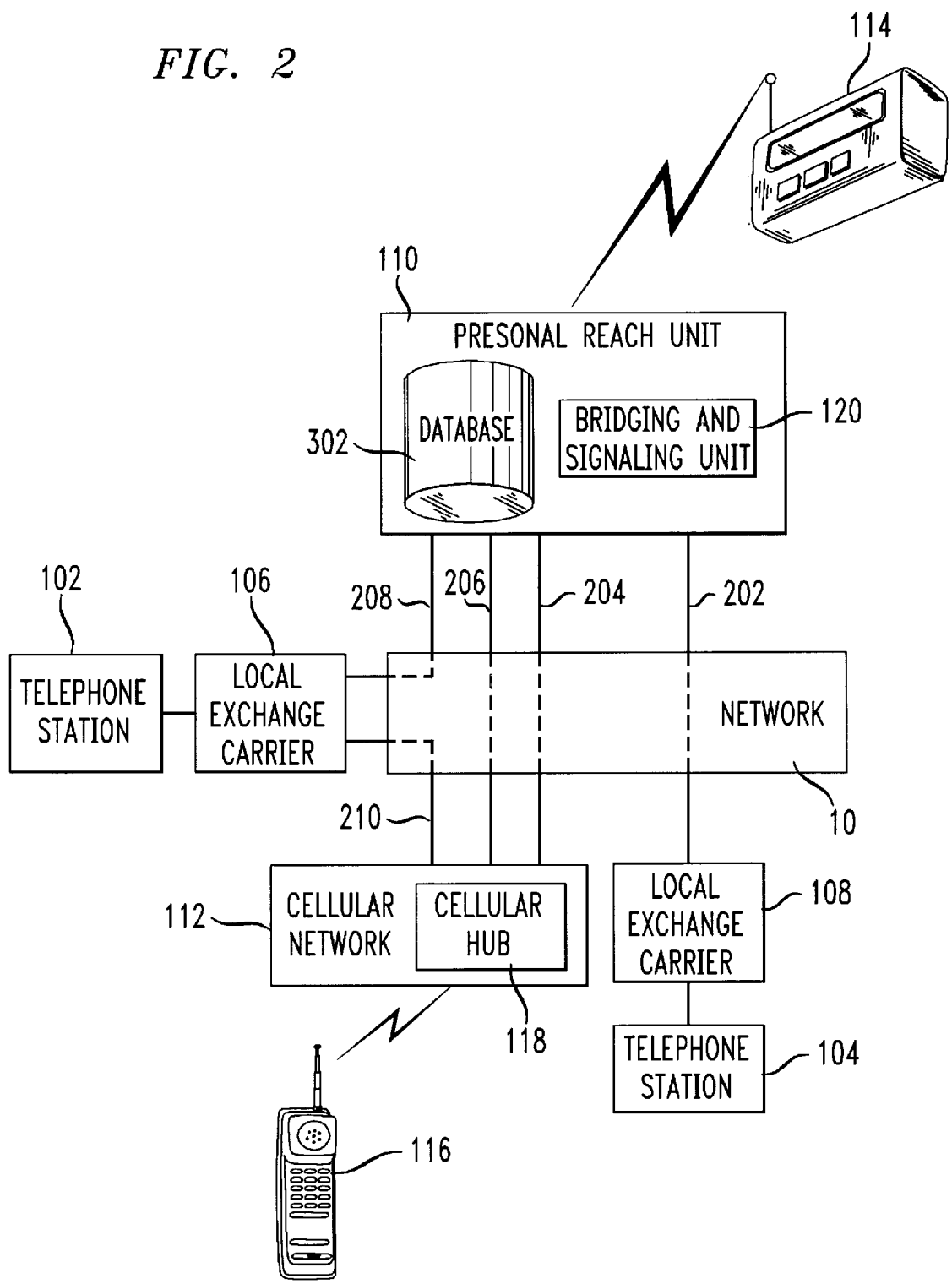
FIG. 2 is a schematic diagram of the telephone system shown in FIG. 1.

FIG. 2 shows a schematic diagram of the communication paths among the telephone station 102, the personal reach system 110, the cellular network 112, and the telephone station 104 through the network 10. When the first party calls the personal reach system 110 using the telephone station 102, the telephone station 102 is connected to a bridging and signaling unit (BSU) 120 of the personal reach system 110 through the communication path 208.

After receiving the first party's call, the BSU 120 retrieves from the database 302 information associated with the second party based upon the telephone number dialed by the first party. The retrieved information from the database 302 contains data identifying the cellular phone 116 (and the pager 114, if applicable) of the second party. Then, the BSU 120 connects to the cellular hub 118 of the cellular network 112 through communication path 204 for paging the second party through the cellular phone 116. The BSU 120 also pages the second party through pager 114, if the second party subscribes to the paging service. In addition, the BSU 120 establishes a voice connection to the cellular hub 118 through communication path 206. The communication path 206 permits the second party to answer the page via the cellular phone 116.

At this point, the second party may decide to answer the page in either of two ways. The second party may answer the page by simply turning on the cellular phone 116. Once on, the cellular phone 116 may ring. If the second user chooses to answer the page using the cellular phone 116, the BSU 120 routes the first party's call to the cellular hub 118 creating communication path 210. After the first party and the second party are connected to each other through telephone station 102, local exchange carrier 106, communication path 210, cellular network 112 and cellular phone 116, the BSU 120 drops out of the connection, thus removing communication paths 204, 206 and 208. Because the BSU 120 dropped out of the connection the second party (subscriber) will only incur the cost of the cellular network 112 and be relieved from paying the cost of the BSU 120 and the related cost for the communication paths 204, 206 and 208.

Alternatively, the second party may answer the page by going to the landline telephone station 104 and calling the BSU 120. After receiving the second party's call through the telephone station 104, the local exchange carrier 108 and communication path 202, the BSU 120 bridges the first party to the second party by connecting communication path 208 with the communication path 202. After the first party and second party are bridged, the voice communication path 206 and the cellular network 112 are dropped so that the second party (subscriber) does not incur the related costs.

If the second party fails to answer the page either through the cellular phone 116 or through the landline telephone station 104, the BSU 120 may permit the first caller to leave a voice message in a voice mailbox that may be provided as part of the personal reach service. In this case, the second party only pays for the voice mailbox service and does not pay for any connection costs.

Figure 3:
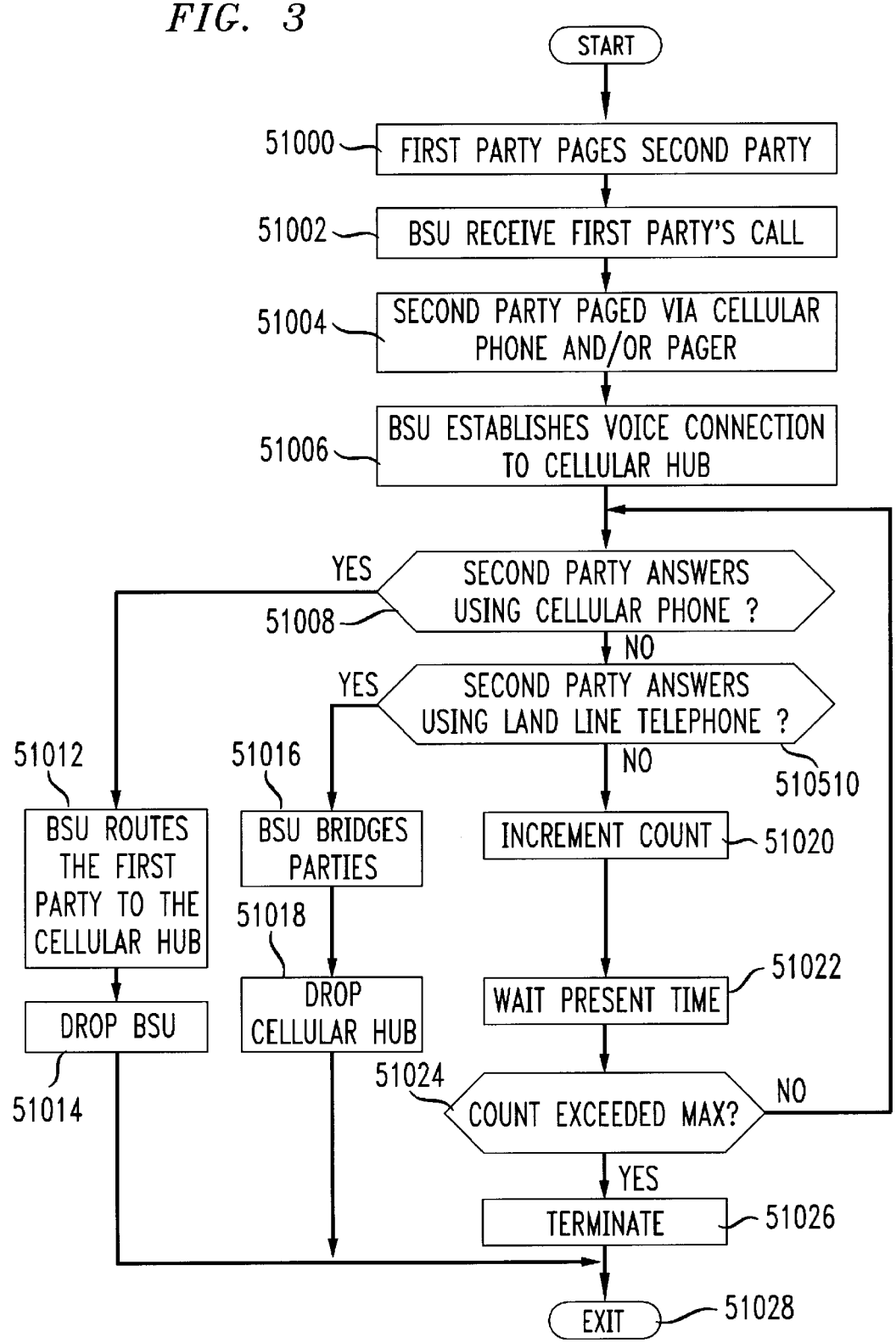
FIG. 3 is a flowchart of a paging process that includes a subscriber responding via a cellular phone or a landline phone.

FIG. 3 shows a flowchart of a process for the above described personal reach system. In step S1000, the first party pages the second party by calling the personal reach system 110 using a telephone number assigned to the second party. Then the process goes to step S1002. In step S1002, the BSU 120 receives the first party's call and the process goes to step S1004. In step S1004, the BSU 120 connects to the cellular hub 118 of the cellular network 112 through communication path 204 to send a paging signal to the second party through the cellular phone 116. If the second party also subscribes to a paging service via the pager 114, the BSU 120 also sends a paging signal to the pager 114. Then the process goes to step S1006. In step S1006, the BSU 120 establishes a voice connection to the cellular hub 118 and the process goes to step S1008.

In step S1008, the BSU 120 determines whether the second party answered the page by using the cellular phone 116. If the second party answers the page using the cellular phone 116, the process goes to step S1012. Otherwise, the process goes to step S1010. In step S1012, the BSU 120 routes the first party to the cellular hub 118 and connects the first party to the second party. Then the process goes to step S1014. In step S1014, the BSU 120 drops out of the connection leaving the first party connected to the second party through the cellular hub 118. Then the process goes to step S1028 and ends.

In step S1010, the BSU 120 determines whether the second party answered the page by using a landline telephone such as telephone station 104. If the second party answered the page using the telephone station 104, the process goes to step S1016. Otherwise, the process goes to step S1020. In step S1016, the BSU bridges the first party and the second party. Then the process goes to step S1018. In step S1018, the cellular hub 118 is dropped from the connection. Then the process goes to step S1028 and ends leaving the first party connected to the second party connected through the BSU 120.

In step S1020, the BSU 120 increments a count and goes to step S1022. In step S1022, the BSU 120 waits for a preset amount of time. Then the process goes to step S1024.

In step S1024, the BSU 120 determines whether the count exceeded a maximum value. If the count exceeded a maximum value, the process goes to step S1026. Otherwise, the process returns to step S1008.

In step S1026, the BSU 120 terminates the paging process and offers the first party to leave a message in the voice mailbox of the second party if the second party has subscribed to such a service. After the BSU 120 receives the message and stores the message in the voice mailbox, the process goes to step S1028 and ends the process by going on-hook with respect to the first party.

While this invention has been described in conjunction with specific embodiments thereof, it is evident that many alternatives, modifications, and variations will be apparent to those skilled in the art. Accordingly, preferred embodiments of the invention as set forth herein are intended to be illustrative, not limiting. Various changes may be made without departing from the spirit and scope of the inventions as defined in the following claims.

What is claimed is:

1. A personal reach system, comprising:

a network;

a personal reach unit coupled to the network;

a cellular network couplable to the personal reach unit through the network, the cellular network including a cellular phone; and a second party landline telephone station couplable to the personal reach unit through the network;

wherein:

when a first party pages a second party with a page through the personal reach unit, a connection is established between the first party and the second party by a path extending through the personal reach unit using either the second party landline telephone station or the cellular phone; and after the first party is connected to the second party using the cellular phone, the personal reach unit is removed from the path connecting the first party to the second party.

2. The personal reach system of claim 1, wherein the personal reach unit comprises:

a bridging and signaling unit, wherein in response to a page request of the first party's, the bridging and signaling unit connects to the cellular network and pages the second party through a data channel of the cellular phone, the bridging and signaling unit establishing a voice connection to the cellular network, the voice connection being associated with the page request of the first party.

3. The personal reach system of claim 2, wherein if the second party responds to the page by calling the personal reach system through the landline telephone station, then the bridging and signaling unit bridges the first party to the second party, the bridging and signaling unit dropping all connections to the cellular network.

4. The personal reach system of claim 2, wherein if the second party responds to the page by using the cellular phone, then the bridging and signaling unit connects the first party to the second party by routing the first party directly to the cellular network, the bridging and signaling unit dropping all connections to the first party and the cellular network after the first and second parties are connected.

5. The personal reach system of claim 2, wherein the bridging and signaling unit pages the second party through a pager.

6. The personal reach system of claim 2, wherein if the second party fails to answer the page, then the personal reach unit prompts the first party to leave a message in a voice mailbox of the second party and the first party leaves a message in the voice mailbox of the second party.

7. A method for operating a personal reach system, comprising:

receiving a page request from a first party to page a second party with a page, the page request being received by a personal reach unit coupled to a cellular network through a network, the cellular network including a cellular phone; and connecting the first party to the second party by either a second party landline telephone station or the cellular phone, comprising:

establishing a connection between the first party and the second party by a path extending through the personal reach unit using either the second party landline telephone station or the cellular phone, and after the first party is connected to the second party using the cellular phone, removing the personal reach unit from the path connecting the first party to the second party.

8. The method of claim 7, further comprising:

connecting a bridging and signaling unit to the cellular network;

establishing a voice connection to the cellular network associated with the page request of the first party; and paging the second party with a page through a data channel of the cellular phone.

9. The method of claim 8, further comprising:

bridging the first party to the second party through the bridging and signaling unit and the landline telephone station if the second party responds to the page by calling the personal reach system through the landline telephone station; and dropping all connections between the cellular network and the bridging and signaling unit.

10. The method of claim 8, further comprising:

routing the first party directly to the second party through the cellular network and the cellular phone if the second party responds to the page by using the cellular phone; and dropping the bridging and signaling unit from all connection to the first party and the cellular network after the first and the second parties are connected.

11. The method of claim 8, further comprising:

paging the second party using a pager.

12. The method of claim 8, further comprising:

prompting the first user for a voice message if the second party fails to respond to the page; and storing the voice message in a voice mailbox of the second party.

13. A personal reach system, comprising:

a network;

a personal reach unit couplable to the network; and a cellular network couplable to the personal reach unit; wherein:

when a first party pages a second party with a page through the personal reach unit, a connection is established between the first party and the second party by a path from the first party to the second party extending at least through the personal reach unit, and when the first party is connected to the second party on the cellular network, the personal reach unit is removed from the path connecting the first party to the second party.

14. The personal reach system of claim 13, wherein the personal reach unit comprises a bridging and signaling unit, wherein, in response to a page request of the first party, the bridging and signaling unit connects to the cellular network and pages the second party through a data channel of a cellular phone, the bridging and signaling unit establishing a voice connection to the cellular network, the voice connection being associated with the page request of the first party.

15. The personal reach system of claim 14, wherein when the second party responds to the page by calling the personal reach system through a telephone station, the bridging and signaling unit bridges the first party to the second party, the bridging and signaling unit dropping all connections to the cellular network.

16. The personal reach system of claim 14, wherein, when the second party responds to the page by using the cellular phone, the bridging and signaling unit connects the first party to the second by routing the first party directly to the cellular network, the bridging and signaling unit dropping all connections to the first party and the cellular network after the first and second parties are connected.

17. The personal reach system of claim 14, wherein the bridging and signaling unit pages the second party through a pager.

18. The personal reach system of claim 14, wherein, when the second party fails to answer the page, the personal reach unit prompts the first party to leave a message in a voice mailbox of the second party.

19. A personal reach system, comprising:

a network;

a personal reach unit couplable to the network; and a cellular network couplable to the personal reach unit; wherein:

when a first party pages a second party with a page through the personal reach unit, a connection is established between the first party and the second party by a path from the first party to the second party extending at least through the personal reach unit, and when the first party is connected to the second party by a telephone station coupled to the path extending through personal reach unit, all connections to the cellular network are dropped.

20. The personal reach system of claim 19, wherein the personal reach unit comprises a bridging and signaling unit, wherein, in response to a page request of the first party, the bridging and signaling unit connects to the cellular network and pages the second party through a data channel of a cellular phone, the bridging and signaling unit establishing a voice connection to the cellular network, the voice connection being associated with the page request of the first party.

21. The personal reach system of claim 20, wherein, when the second party responds to the page by calling the personal reach system through a telephone station, the bridging and signaling unit bridges the first party to the second party, the bridging and signaling unit dropping all connections to the cellular network.

22. The personal reach system of claim 20, wherein, when the second party responds to the page by using the cellular phone, the bridging and signaling unit connects the first party to the second by routing the first party directly to the cellular network, the bridging and signaling unit dropping all connections to the first party and the cellular network after the first and second parties are connected.

23. The personal reach system of claim 20, wherein the bridging and signaling unit pages the second party through a pager.

24. The personal reach system of claim 20, wherein when the second party fails to answer the page, the personal reach unit prompts the first party to leave a message in a voice mailbox of the second party.

25. A method for operating a personal reach system, comprising:

receiving a page request from a first party to page a second party with a page, the page request received by a personal reach unit couplable to a cellular network through a network;

establishing a connection between the personal reach unit and the cellular network; and connecting the first party to the second party, comprising:
establishing a connection between the first party and the second party by a path extending at least through the personal reach unit, and
removing, when the first party is connected to the second party on the cellular network, the personal reach unit from the path connecting the first party to the second party.

26. The method of claim 25, further comprising:
connecting a bridging and signaling unit to the cellular network;
establishing a voice connection to the cellular network associated with the page request of the first party; and
paging the second party with a page through a data channel of a cellular phone.

27. The method of claim 26, further comprising:
bridging the first party to the second party through the bridging and signaling unit and a telephone station when the second party responds to the page by calling the personal reach system through the telephone station; and
dropping all connections between the cellular network and the bridging and signaling unit.

28. The method of claim 26, further comprising:
routing the first party directly to the second party through the cellular network and the cellular phone when the second party responds to the page by using the cellular phone; and
dropping the bridging and signaling unit from all connections to the first party and the cellular network after the first and the second parties are connected.

29. The method of claim 26, further comprising:
paging the second party using a pager.

30. The method of claim 26, further comprising:
prompting the first user for a voice message if the second party fails to respond to the page.

31. The method of claim 30, further comprising storing the voice message in a voice mailbox of the second party.

32. A method for operating a personal reach system, comprising:

receiving a page request from a first party to page a second party with a page, the page request being received by a personal reach unit couplable to a cellular network through a network;

establishing a connection between the personal reach unit and a cellular hub of the cellular network; and connecting the first party to the second party, comprising:
establishing a connection between the first party and the second party by a path extending at least through the personal reach unit;
dropping, when the first party is connected to the second party by a connection other than through the cellular network, all connections to the cellular network.

33. The method of claim 32, further comprising:
connecting a bridging and signaling unit to the cellular network;
establishing a voice connection to the cellular network associated with the page request of the first party; and
paging the second party with a page through a data channel of a cellular phone.

34. The method of claim 33, further comprising:
bridging, when the second party responds to the page by calling the personal reach system through the telephone station, the first party to the second party through the bridging and signaling unit and the telephone station, and
dropping all connections between the cellular network and the bridging and signaling unit.

35. The method of claim 33, further comprising:
routing the first party directly to the second party through the cellular network and the cellular phone when the second party responds to the page by using the cellular phone; and
dropping the bridging and signaling unit from all connection to the first party and the cellular network after the first and the second parties are connected.

36. The method of claim 33, further comprising:
paging the second party using a pager.

37. The method of claim 33, further comprising:
prompting the first user for a voice message if the second party fails to respond to the page.

38. The method of claim 37, further comprising storing the voice message in a voice mailbox of the second party.

39. A personal reach system, comprising:
a personal reach unit, comprising:
a first connection, couplable to a cellular network, for connecting a first party to a second party;
a second connection, couplable to a communications device, for connecting the first party to the second party;
wherein:
when the first party pages the second party with a page through the personal reach unit, a connection is established between the first party and the second party by a path from the first party to the second party extending at least through one of the first and second connections of the personal reach unit, and
when the first party is connected to the second party, the personal reach unit is removed from the path connecting the first party to the second party.

40. A personal reach system, comprising:
a personal reach unit, comprising:
a first connection, couplable to a cellular network, for connecting a first party to a second party;
a second connection, couplable to a communications device, for connecting the first party to the second party;
wherein:
when a first party pages a second party with a page through the personal reach unit, a connection is established between the first party and the second party by a path from the first party to the second party extending at least through one of the first and second connections of the personal reach unit, and
when the first party is connected to the second party by the communication device coupled to the path extending through the personal reach unit, all connections to the cellular network are dropped.

* * * * *